July 16, 1940.  W. L. TUELL  2,207,958
INTERIOR CONSTRUCTION FOR MOTOR VEHICLES
Filed Feb. 7, 1938  2 Sheets-Sheet 1
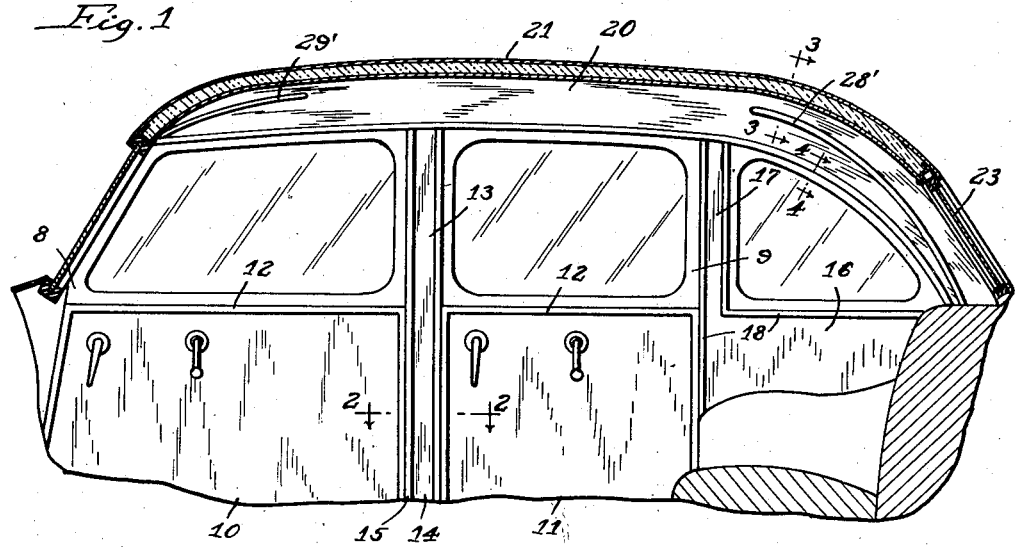
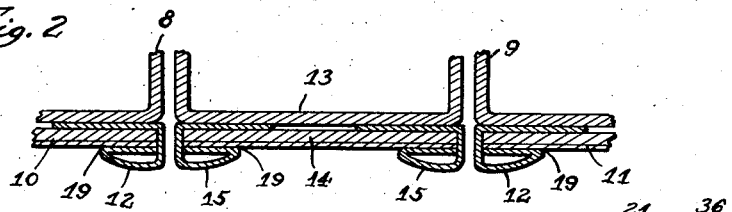
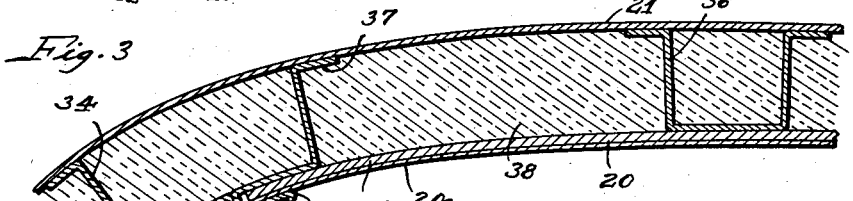
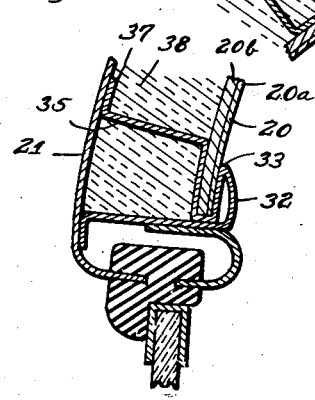
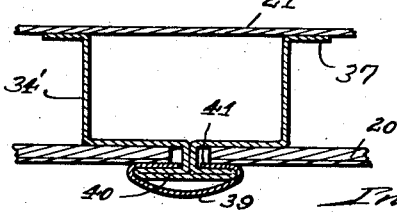
Inventor:
Willard Leo Tuell
By McCanna, Wintercorn & Morsbach
Attys.

July 16, 1940. W. L. TUELL 2,207,958
INTERIOR CONSTRUCTION FOR MOTOR VEHICLES
Filed Feb. 7, 1938 2 Sheets-Sheet 2

Inventor:
Willard Leo Tuell
By McCanna, Wintercorn & Morebach
Attys.

Patented July 16, 1940

2,207,958

UNITED STATES PATENT OFFICE 2,207,958

INTERIOR CONSTRUCTION FOR MOTOR VEHICLES

Willard Leo Tuell, Rockford, Ill.

Application February 7, 1938, Serial No. 189,050

6 Claims. (Cl. 296—137)

This invention relates to an improved interior construction for motor vehicles.

Mohair has been used extensively for covering the interiors of automobiles, although it is generally appreciated that there are many serious objections to its use, such as its tendency to hold dust and dirt, the difficulty of cleaning the same, and the high material and labor costs involved in applying the same at the automobile factory. It is therefore the principal object of my invention to provide wood veneer panels for covering the interior of the side walls and top, the panels being applied in a novel manner by means of specially constructed metal retaining strips which, in the case of the top construction, are incorporated so as to take advantage of the internal stresses set up in the mechanically warped veneer to securely anchor the same so that there is no danger of any loose edges being left, the resulting interior being of attractive appearance, and, besides being at least as low in cost as others used heretofore, avoiding the more serious objections to which those were subject, and affording many important advantages, as will later appear.

A special feature of the veneered interior of my invention is the novel manner in which the compound curvatures of the veneer in the corners of the top are taken care of, the retaining strips employed at these points being installed in such a way that they lend beauty instead of detracting from the appearance of the interior.

Still another feature of the invention is the provision of ribs for spacing the veneer from the outer wall in the top construction so as to keep the veneer conformed to the curvature of the steel turret top and spaced therefrom uniformly at all points to permit filling the intervening space with insulating material to deaden sound and also keep the interior of the car cooler in summer and warmer in winter.

The invention is illustrated in the accompanying drawings, wherein—

Figure 1 is a longitudinal section through an automobile body, showing a veneered interior made in accordance with my invention, the top being shown approximately on the line 1—1 of Fig. 6;

Figs. 2 to 4 are sectional details on the correspondingly numbered lines of Fig. 1;

Fig. 5 is a sectional detail corresponding to a portion of Fig. 3, showing a modified or alternative construction.

Similar reference numerals are applied to corresponding parts throughout the views.

Figure 6:
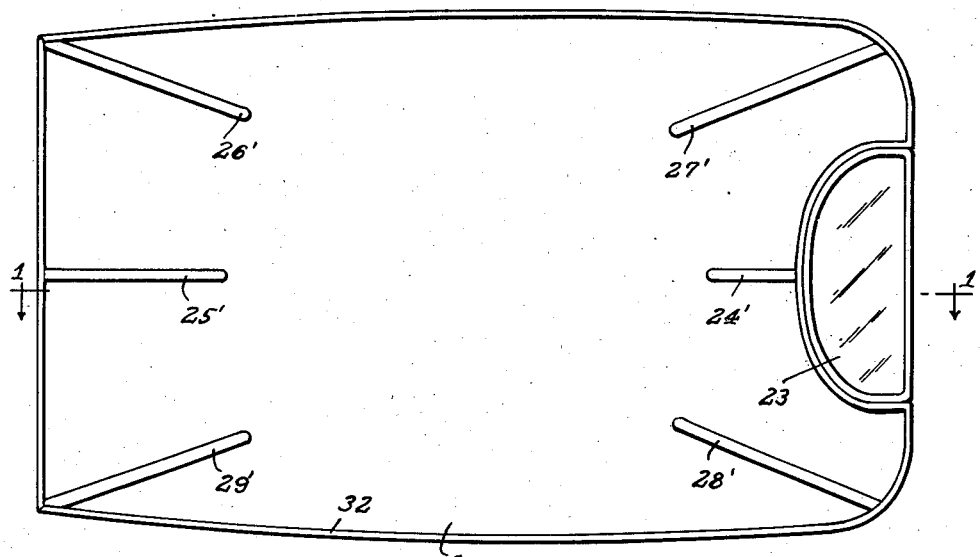
Fig. 6 is a plan view of the veneered top viewed from beneath, using a veneer cut to the approximate pattern appearing in Fig. 7.

The automobile body shown in Fig. 1 has the interior of the doors 8 and 9 covered by veneer panels 10 and 11, respectively, suitably secured around the edges by metal retaining strips 12. The interior of the door pillar 13 is likewise covered with a wood veneer panel 14 retained along its lateral edges by metal retaining strips 15. In a similar manner, a wood veneer panel 16 is provided on the side walls alongside the back seat and reaching upwardly along the inside of the rear door pillar 17, metal retaining strips 18 like the strips 12 and 15 being employed to hold this panel in place. In the installation of narrow strips of veneer like that at 14 and 17, the veneer can be slid in endwise between the retaining strips. The other panels can be inserted by buckling the same enough to get the edges into the channels 19 in the strips, it being understood, for one thing, that the wood veneer employed will be fairly thin and pliable, preferably only two-ply material, the grains in which, of course, extend transversely with respect to one another. Usually the panels will be steamed before use to increase pliability and thereby facilitate the installation. All of the retaining strips 12, 15, and 18 are fastened by screws or other means to their supports prior to the installation of the veneer panels.

Figure 7:
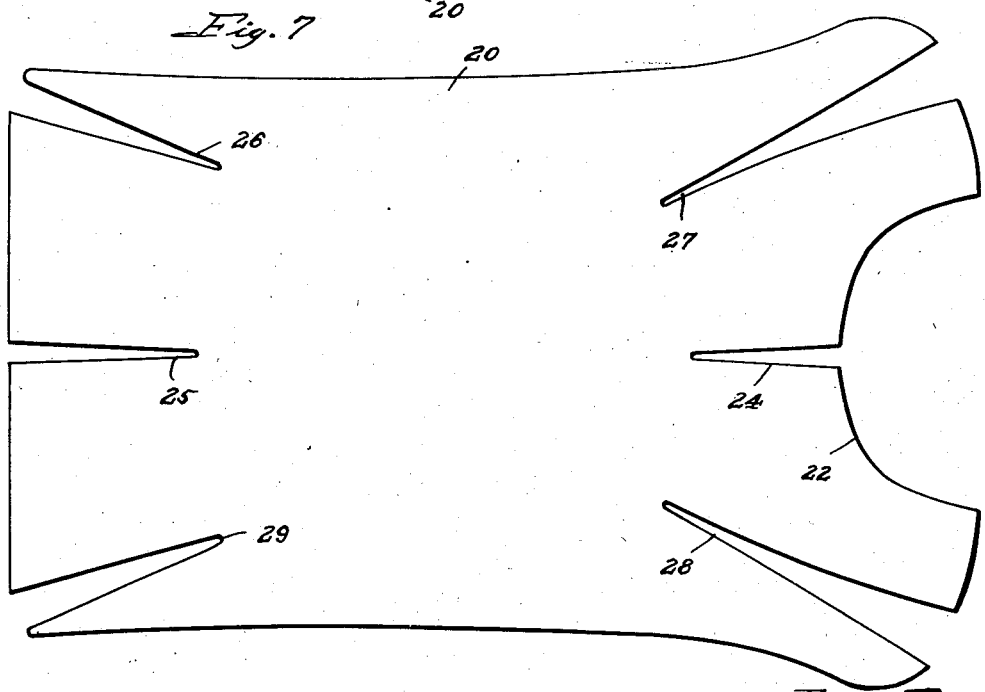

In the top construction, more serious problems are, of course, presented because of the compound curvature at opposite ends. A one-piece wood veneer panel 20 is used for the top in spaced relation to the steel outer wall 21 commonly called the "turret" top. This panel 20, in addition to being cut away at one end, as at 22, to fit around the rear window 23, has V gores cut therein from both ends at the middle, as at 24 and 25, and diagonally extending V gores cut therein from the four corners, as at 26—29 (Fig. 7). The pattern is otherwise of generally rectangular form, as shown. Just enough material is cut out at the six points 24—29 so that when this panel it curved inwardly at both ends to follow the general curvature of the top of the car, and also curved inwardly at opposite sides at the ends to follow the general transverse curvature of the top, the V-shaped gores 24—29 become regular parallel-sided slits that accommodate retaining strips 24'—29', as indicated in Fig. 6, the fit at each of these slits being like that indicated at the strip 28' in Fig. 3. That is, each of these strips 24'—29' provides opposed channels 30 behind the exposed cross-portion 31 of its T-shaped cross-section. The retaining strips 32 employed around the outer edges of the panel 20 are similar to the strips 12, 15, and 18 previously described, in that they provide a single channel 33 therein to accommodate the edges of the panel. Now, all of the retaining strips 24'—29' are preferably formed as integral parts of generally channel-shaped sheet metal ribs 34. The strips 32 are similarly formed integral with generally channel-shaped sheet metal ribs 35 of approximately half the width of the ribs 34, that portion of each rib 35 forming the strip 32 being of substantially S-shaped cross-section, as clearly appears in Fig. 4. The ribs 34 and 35 space their retaining strips in a predetermined relation to the outer metal wall 21 to accordingly space the veneer panel 20, and other channel-shaped sheet metal ribs 36 will be provided between the outer wall 21 and panel 20 to keep the panel substantially uniformly spaced from the outer wall and conformed in shape to the general curvature of said outer wall. All of these ribs 34, 35 and 36 may be secured to the outer wall 21 in any suitable manner as by means of flanges 37. The intervening space can be filled with sound-deadening and insulating material, as indicated at 38. This can be of any suitable or preferred type, and will not only serve to deaden sound, but also keep the interior of the car cooler in summer and warmer in winter. Here again, in the installation of the veneer panel, all of the retaining strips will be in place before the panel is installed, and the panel will be buckled enough to work the edges into the channels 30 and 33 afforded by the retaining strips. The panel is fairly thin and pliable and can moreover be steamed before use to insure greater pliability. I prefer, especially in the case of the top panel 20, to have the inner ply 20a appreciably thinner than the outer ply 20b, because this gives the panel a natural tendency toward the final convexo-concave shape which it assumes when installed in the top of the car. The workman in applying the panel therefore has this inherent tendency toward warpage in the direction stated working to his advantage and does not have as much difficulty in working the edges into place.

It should be clear from the foregoing description that I have provided an extremely practical veneered interior for automobiles. Veneering of the top which necessitates special cutting and fitting of the veneer, as above described, does not involve any unsightly cracks or crevices where some of the material is necessarily cut away, but, as a matter of fact, the appearance of the top when finally installed under the retaining strips is actually enhanced by the strips 24'—29' extending inwardly approximately radially toward the center of the top. The strips 24'—29' will be suitably plated or otherwise finished, preferably in contrast to the finish of the veneer, to further improve the appearance. If desired, a separate specially plated or finished strip like that shown at 39 in Fig. 5 may be provided made of C-shaped cross-section and adapted to be slipped over the plain unfinished T-head 40 of the retaining strip 34', it being understood, of course, that this sort of contruction would be used in place of the strips 24'—29'. An advantage of this sort of construction is that it permits insertion of the veneer loosely into the channels 30 of the retaining strips and then when the whole panel is installed the finishing strips 39 can be put in and the veneer made tight by the crowding in of the flanges 41. In a similar way, I may provide separate strips inserted in the channels 30 of the other retaining strips 12, 15 and 18, either as a means of tightening the veneer or as a means of improving the appearance of the retaining strips, or both. If desired, I may also provide some spring means behind the veneer to crowd it at its edges into tighter engagement with the outer walls of the channels 30 so as to make neat joints at all of the retaining strips.

It is believed the foregoing description conveys a good understanding of the objects and advantages of my invention. The appended claims have been drawn with a view to covering all legitimate modifications and adaptations.

I claim:

1. In a top construction for automobiles, the combination with a rigid metallic outer top wall curved transversely and longitudinally, of a one-piece thin flexible semi-rigid generally rectangular inner top wall of non-metallic sheet material, said wall having elongated V-notches cut therein extending diagonally inwardly from the corners thereof to permit curving the end portions to conform approximately to the curvature of the outer wall and means including portions entered in the notches for securing said inner wall in substantially uniformly spaced relation with respect to said outer wall, whereby the inner wall is held generally to the curvature of the outer wall.

2. In a top construction for automobiles, the combination with a rigid metallic outer top wall curved transversely and longitudinally, of a one-piece thin flexible semi-rigid generally rectangular inner top wall of non-metallic sheet material, said wall having elongated V-notches cut therein extending diagonally inwardly from the corners and also longitudinally inwardly from the middle of the ends thereof to permit curving the end portions transversely and longitudinally to conform approximately to the curvature of the outer wall, and means including portions entered in the notches for securing said inner wall in substantially uniformly spaced relation with respect to said outer wall, whereby the inner wall is held generally to the curvature of the outer wall.

3. In a top construction for automobiles, the combination with a rigid metallic outer top wall curved transversely and longitudinally, of a one-piece thin flexible semi-rigid generally rectangular inner wall of wood veneer, said wall having elongated V-notches cut therein extending diagonally inwardly from the corners thereof to permit curving the end portions to conform approximately to the curvature of the outer wall, and means for securing said inner wall in substantially uniformly spaced relation with respect to said outer wall, whereby the inner wall is held generally to the curvature of the outer wall, said last mentioned means including elongated retaining strips of T-shaped cross-section supported in rigid relation with the outer wall and arranged to fit in the V-notches in said inner wall with the cross-portion of the T on each of said strips overlapping on both sides of the notches.

4. In a top construction for automobiles, the combination with a rigid metallic outer top wall curved transversely and longitudinally, of a one-piece thin flexible semi-rigid generally rectangular inner wall of wood veneer, said wall having elongated V-notches cut therein extending diagonally inwardly from the corners and also longitudinally inwardly from the middle of the ends thereof to permit curving the end portions transversely and longitudinally to conform approximately to the curvature of the outer wall, and means for securing said inner wall in substantially uniformly spaced relation with respect to said outer wall, whereby the inner wall is held generally to the curvature of the outer wall, said last mentioned means including elongated retaining strips of T-shaped cross-section supported in rigid relation with the outer wall and arranged to fit in the V-notches in said inner wall with the cross-portion of the T of each of said strips overlapping on both sides of the notches.

5. In a top construction for automobiles, the combination with a rigid metallic outer top wall curved transversely and longitudinally, of a one-piece thin flexible semi-rigid generally rectangular inner wall of non-metallic sheet material, said wall having elongated V-notches cut therein extending diagonally inwardly from the corners thereof to permit curving the end portions to conform approximately to the curvature of the outer wall, and means for securing said inner wall in substantially uniformly spaced relation with respect to said outer wall, whereby the inner wall is held generally to the curvature of the outer wall, said last mentioned means including elongated retaining strips of T-shaped cross-section supported in rigid relation with the outer wall and arranged to fit in the V-notches in said inner wall with the cross-portion of the T on each of said strips overlapping on both sides of the notches.

6. In a top construction for automobiles, the combination with a rigid metallic outer top wall curved transversely and longitudinally, of a one-piece thin flexible semi-rigid generally rectangular inner wall of non-metallic sheet material, said wall having elongated V-notches cut therein extending diagonally inwardly from the corners and also longitudinally inwardly from the middle of the ends thereof to permit curving the end portions transversely and longitudinally to conform approximately to the curvature of the outer wall, and means for securing said inner wall in substantially uniformly spaced relation with respect to said outer wall, whereby the inner wall is held generally to the curvature of the outer wall, said last mentioned means including elongated retaining strips of T-shaped cross-section supported in rigid relation with the outer wall and arranged to fit in the V-notches in said inner wall with the cross-portion of the T of each of said strips overlapping on both sides of the notches.

WILLARD LEO TUELL.